United States Patent Office 2,779,771
Patented Jan. 29, 1957

2,779,771

HIGHER FATTY ESTER DIEPOXIDES AND PROCESS OF PRODUCING THE SAME

Benjamin Phillips and Frederick C. Frostick, Jr., Charleston, W. Va., assignors to Union Carbide and Carbon Corporation, a corporation of New York No Drawing. Application March 25, 1954,
Serial No. 418,763

6 Claims. (Cl. 260—348)

The present invention relates to a new class of organic chemical compounds and the method of producing the same. More particularly the compounds of this invention relate to a new class of polymerizable and copolymerizable esters derived by the selective epoxidation of unsaturated fatty acid esters.

The compounds of this invention are the allyl and vinyl 9,10,12,13-diepoxystearates and may be represented by the general formula:

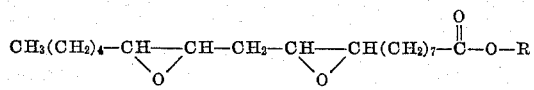

wherein R represents an alkenyl radical containing from two to three carbon atoms.

These new diepoxides of the fatty acid ester series are useful as plasticizers and stabilizers for synthetic organic resins.

One of the primary purposes of this invention, as pointed out above, is to provide bifunctional types of ester compounds which are capable of forming three-dimensional polymers having the valuable properties of insolubility and infusibility, and containing dissimilar polymerizable groups which polymerize by different reaction mechanisms. The result is that the esters of this invention can be completely polymerized through one group to the exclusion of polymerization of the other group.

These two dissimilar polymer-forming groups contained in the esters of the invention are an epoxide group and an olefinic group. These two dissimilar groups form polymers by entirely different reaction mechanisms. The ester can be subjected to conditions whereby polymerization occurs through one group to the exclusion of polymerization through the second group. The resulting polymer can then be further polymerized under different conditions through the unaffected second group so that an infusible and insoluble polymer is formed. This dissimilarity of the polymer-forming groups enables control over polymer formation so as to produce polymers having a diversity of properties not heretofore available.

The compounds of this invention are produced by the action of an epoxidizing agent on the unsaturated ester of a dienoic fatty acid. The reaction involves the selective epoxidation of the reaction product of unsaturated alcohols and unsaturated fatty acid in which the double bonds of the fatty acid portion of the molecule are epoxidized while the double bond in the alcohol portion remain unaffected.

The reaction whereby the compounds of this invention are produced, may be represented, in the case of the starting material, vinyl linoleate, by the following equation:

Prior to the selective epoxidation reaction, the dienoic fatty acid is esterified in any convenient manner with various unsaturated alcohols.

The unsaturated alcohols which can be utilized in preparing the starting materials are alcohols which may contain one or more double bonds in the carbon chain but it is preferred to employ alcohols containing a single double bond such as, for example, allyl alcohol and the like.

The process by which the epoxides of this invention are obtained involves the use of peracetic acid as the epoxidation agent. The unsaturated ester of the dienoic fatty acid is charged to a reaction vessel and peracetic acid is then added gradually to the unsaturated starting material. The temperature at which the reaction mixture can be maintained may vary within the limits of −10° C. to 75° C. although it is preferred that the temperature be maintained in the range 25° C. to 50° C. The reaction conditions are maintained until an analysis for peracetic acid indicates that substantially all of the peracetic acid charged to the reaction has been consumed. The reaction time will vary usually from two to eight hours, depending of course, on the temperature and the concentration of the peracetic acid in the reaction vessel.

The unsaturated ester of the dienoic fatty acid and peracetic acid are ordinarily employed in such a manner as to provide from 10 to 25 mol percent excess of peracetic acid in the reaction mixture but more or less peracetic acid can be employed and even an excess of the unsaturated ester may at times be employed, if desirable.

The peracetic acid is usually added to the reaction vessel as a solution of peracetic acid in an inert solvent such as, for example, acetone and the like.

After the reaction period is over the reaction solution is worked up by removing the solvent; any excess peracetic acid and acetic acid is removed by any convenient means, such as, distillation or extraction.

It is preferred, as a matter of convenience, however, to add the reaction solution to a still kettle containing ethylbenzene, as a pot boiler, refluxing at approximately 25 millimeters of Hg pressure and distilling off acetone, peracetic acid, acetic acid and ethylbenzene. After the reaction solution is added to the still kettle, the distillation is continued to remove all low-boiling material. A residue product is obtained which is further purified by continuous distillation or otherwise at pressures of from one to two millimeters of Hg.

The following examples will serve to illustrate the practice of the invention:

EXAMPLE I

*Epoxidation of the allyl ester of mixed oleic and linoleic acids*

Four hundred thirty-nine grams of a commercially available mixture of fatty acids consisting of:

| | Percent |
|---|---|
| Oleic acid | 41 |
| Linoleic acid | 54 |
| Linolenic acid | 2 |
| Saturated above lauric | 3 | were mixed with 108 grams of allyl alcohol, 400 grams of toluene, and 1.4 grams conc. sulfuric acid and then

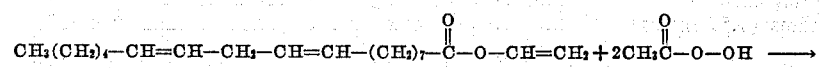

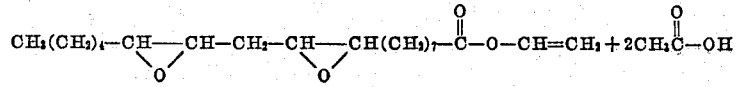

refluxed in a still for nine hours. During this time 36 grams of water layer separated at the still head. The contents of the kettle were cooled and eight grams sodium acetate was added to neutralize the catalyst. Distillation yielded 402 grams of allyl esters of mixed acids, boiling point 156°–173° C. at 0.5 mm., $n_D^{30}=1.4587$–$1.4600$, which analyzed 0.000281 equivalent of acid per gram, and had a saponification equivalent of 322 and an unsaturation equivalent of 137.

Three hundred eighty-seven grams of the above mixed allyl esters were placed in a flask fitted with a stirrer, thermometer, and dropping funnel and heated to 35° C. To the stirred contents maintained at 35°–40° C. was added over a period of two hours 531 grams of a 24.2 percent solution of peracetic acid in acetone. After the addition, the reaction conditions were maintained for two hours forty-five minutes longer and then the reaction solution was stored overnight at —11° C. The reaction solution was then heated to 35°–40° C. again and 107 grams additional 24.2 percent peracetic acid solution was added in ten minutes and the reaction solution was stirred at 35°–40° C. for 5¼ hours longer.

The reaction solution was added dropwise to a still kettle containing ethylbenzene refluxing at 25 mm. Hg pressure and during the addition, acetone, acetic acid, peracetic acid, and ethylbenzene were distilled at the head. After addition, the contents of the kettle were stripped of low-boiling material and there was obtained 423 grams of residue product which had a saponification equivalent and an unsaturation equivalent of 324 and analyzed 5.92 percent oxirane oxygen and 1.2 percent acidity as acetic acid.

The residue product was batch-distilled without rectification to give 302 grams of allyl esters of mixed epoxy and saturated fatty acids, boiling point=188°–205° C. at 1 mm. Hg, $n_D^{30}=1.4567$, $d_{20}^{20}=0.943$. The distillate had a saponification equivalent of 340 and an unsaturation equivalent of 326, analyzed 5.23 percent oxirane oxygen, and the acidity was nil.

EXAMPLE II

*Preparation of allyl 9,10,12,13-diepoxystearate*

Linoleic acid was prepared from commercial safflower oil by a process similar to that described in Organic Synthesis, vol. 22, page 79. Three hundred fifty grams powdered KOH were dissolved in 1500 ml. of methanol in a five-liter reaction flask and then 1100 ml. of safflower oil was added. The kettle contents were stirred and refluxed for two hours and then the methanol was removed by distillation. To the residue was added one liter of water and then 1500 ml. of cold 20 percent sulfuric acid. The fatty acid layer was separated and washed with hot water, filtered while hot, and then dried by heating to 140° C. with stirring. The yield of crude acids at this point was 924 grams.

Seven hundred thirteen grams (11.9 moles) of urea was dissolved in 1069 grams of hot methanol. To this hot solution was added the crude acid (924 grams) and heating was continued until solution was complete. The solution was cooled to —9° C. overnight and then filtered. Methanol was evaporated from the filtrate and then water was added and a fatty acid layer separated out. A small amount of conc. HCl was added and after a short heating period, the water layer was drained off. The acid layer was distilled twice through a six-inch packed column to give 540 grams of product, B. P.=193–197° at 2 mm. Hg, $n_D^{30}=1.4655$, $d_4^{21}=0.8993$ which analyzed 96.2 percent as linoleic acid by titration and gave an iodine number of 171 (theoretical, 181).

To a still kettle was charged 444 grams (1.59 moles) of linoleic acid, 138 grams (2.38 moles) of allyl alcohol, 200 grams benzene, and 0.9 gram of conc. sulfuric acid. The solution was refluxed for six hours while 34 grams of water separated at the head. The kettle contents were cooled and the catalyst was neutralized with 1.5 grams of sodium acetate. Distillation then yielded 446 grams (88 percent) of allyl linoleate, B. P.=160–162° at 0.5 mm. Hg, $n_D^{30}=1.4622$, which analyzed 99.3 percent pure by saponification and had an iodine number of 220.

Four hundred forty grams (1.37 moles) of allyl linoleate was charged to a reaction flask and heated to 35° C. Then with stirring, 1111 grams of a 23.5 percent solution of peracetic acid in acetone (261 grams, 3.43 moles of peracetic acid) was added over a period of 3¼ hours. After addition, the kettle contents were maintained at 35–40° C. for four more hours and then stored overnight at —11° C. Analysis for peracetic acid at this point indicated that 96.6 percent of the theoretical amount had reacted. The solution was heated and maintained at 35–40° C. for one more hour, and analysis indicated 96.9 percent of the theoretical amount of peracetic acid had reacted.

The reaction solution was then added dropwise to a still kettle containing ethyl benzene refluxing at 25 mm. Hg pressure. During the addition, acetone, peracetic acid, acetic acid, and ethylbenzene were distilled, and after the addition, the contents of the kettle were stripped of low-boiling material. There was obtained 502 grams of residue product which analyzed 78.8 percent as allyl 9,10,12,13-diepoxystearate by determination of epoxide groups.

The residue was distilled by dripping into a kettle maintained at 300° C. and 1 mm. Hg pressure. The purified allyl 9,10,12,13-diepoxystearate (B. P.=210° at 1 mm. Hg, $n_D^{30}=1.4614$, $d_4^{24}=0.9690$) analyzed 84.1 percent purity by epoxide determination, 104.1 percent purity by saponification, and 95.8 percent by unsaturation analysis. The yield was 422 grams (87 percent).

In a similar manner the vinyl linoleate can be subjected to expoxidation to yield the vinyl 9,10,12,13-diepoxystearate.

What is claimed is:

1. Diepoxides represented by the general formula:

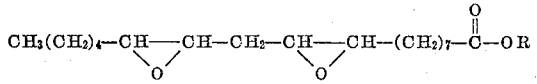

wherein R represents an alkenyl radical containing from 2–3 carbon atoms.

2. Vinyl 9,10,12,13-diepoxystearate.
3. Allyl 9,10,12,13-diepoxystearate.
4. A process for the epoxidation of unsaturated esters of unsubstituted higher dienoic fatty acids which comprises reacting peracetic acid with an unsaturated ester of an unsubstituted higher dienoic fatty acid at a temperature in the range of —10° C. to 75° C.
5. A process for the production of vinyl 9,10,12,13-diepoxystearate which comprises reacting peracetic acid with vinyl linoleate at a temperature in the range of —10 to 75° C.
6. A process for the production of allyl 9,10,12,13-diepoxystearate which comprises reacting peracetic acid with allyl linoleate at a temperature in the range of —10 to 75° C.

References Cited in the file of this patent

UNITED STATES PATENTS

| | | |
|---|---|---|
| 2,485,160 | Niederhauser et al. | Oct. 18, 1949 |
| 2,559,177 | Terry et al. | July 3, 1951 |
| 2,680,109 | Stevens et al. | June 1, 1954 |